(12) United States Patent
Meyuhas et al.

(10) Patent No.: US 11,917,558 B2
(45) Date of Patent: Feb. 27, 2024

(54) DEVICES AND METHODS FOR SPECIFIC ABSORPTION RATE TRANSMISSION CONTROL

(71) Applicant: Intel Corporation, Santa Clara, CA (US)

(72) Inventors: Gil Meyuhas, Tel-Aviv (IL); Rony Ross, Haifa (IL)

(73) Assignee: Intel Corporation, Santa Clara, CA (US)

( * ) Notice: Subject to any disclaimer, the term of this patent is extended or adjusted under 35 U.S.C. 154(b) by 327 days.

(21) Appl. No.: 17/476,494

(22) Filed: Sep. 16, 2021

(65) Prior Publication Data
US 2022/0201627 A1 Jun. 23, 2022

(30) Foreign Application Priority Data
Dec. 23, 2020 (EP) .................................... 20216891

(51) Int. Cl.
*H04B 7/00* (2006.01)
*H04W 52/36* (2009.01)
*H04B 1/3827* (2015.01)

(52) U.S. Cl.
CPC ........ *H04W 52/367* (2013.01); *H04B 1/3838* (2013.01)

(58) Field of Classification Search
CPC ... H04W 52/367; H04W 52/04; H04W 52/18; H04W 52/22; H04W 52/225; H04W 52/24; H04B 1/3838
See application file for complete search history.

(56) References Cited

U.S. PATENT DOCUMENTS

| 10,412,692 | B2 * | 9/2019 | Siomina ............. H04W 52/383 |
| 11,212,756 | B2 * | 12/2021 | Jang .................... H04W 52/365 |
| 11,356,194 | B2 * | 6/2022 | Kondo ................. H04L 1/0001 |
| 2012/0071195 | A1 | 3/2012 | Chakraborty et al. |

OTHER PUBLICATIONS

European Search Report issued for the corresponding European patent application No. 20 21 6891, dated Jun. 17, 2021, 12 pages (for informational purposes only).

* cited by examiner

*Primary Examiner* — Tuan Pham
(74) *Attorney, Agent, or Firm* — Viering, Jentschura & Partner mbB

(57) ABSTRACT

Methods and devices configured to apply a power back-off (PBO) to limit a radio frequency (RF) transmitter power up to a first limit, where the first limit is below a pre-defined RF power limit; accumulate a difference between RF transmission power spent transmitting data and the pre-defined RF power limit over a duration to produce an accumulated energy budget; and once the accumulated energy budget reaches a pre-defined energy credit value, remove the PBO and allow RF transmitter power exceeding the pre-defined RF power limit until the accumulated energy budget meets a threshold.

20 Claims, 8 Drawing Sheets

100

DEVICES AND METHODS FOR SPECIFIC ABSORPTION RATE TRANSMISSION CONTROL

CROSS-REFERENCE TO RELATED APPLICATION

This application claims priority under 35 U.S.C. § 119 European Application No. 20 21 6891.0 filed on Dec. 23, 2020, which is herein incorporated by reference in its entirety.

Technical Field

Various aspects relate generally to wireless communications and transmit power control techniques.

Background

New developments in modern communication technologies, e.g., 5G New Radio (NR) and Wireless Local Area Networks (WLANs) such as Wi-Fi, have been directed at utilizing higher radio frequencies in the millimeter wave (mmWave) spectrum and beamforming to improve throughput and reduce frequency with existing wireless systems. While these techniques provide many advantages, they may also increase radio frequency (RF) radiation in the environment, including to users. For example, this may include device transmissions that deliver elevated levels of radiation energy to a focused area. When this focused area is directed in the direction of the user, the device may deliver high levels of radiation to the user and the signal quality may also be significantly degraded. The amount of radiation energy emitted and absorbed by a unit of mass of a user over time may be defined as the specific absorption rate (SAR).

Various regulators, including the Federal Communications Commission (FCC) and the International Commission on Non-Ionizing Radiation Protection (ICNIRP), and standardization bodies like the $3^{rd}$ Generation Partnership Project (3GPP) have introduced SAR and other power density measures that limit the amount of radiation that a device can deliver. For example, the FCC has imposed a limit for public exposure from cellular devices at a level of 1.6 watts per kilogram (W/kg) for devices operating at or below 6 GHz.

In response, methods and devices that implement time-averaging SAR (TAS) mechanisms have been introduced to comply with these regulatory measures.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the disclosure. In the following description, various aspects of the disclosure are described with reference to the following drawings, in which.

DESCRIPTION

Figure 1:
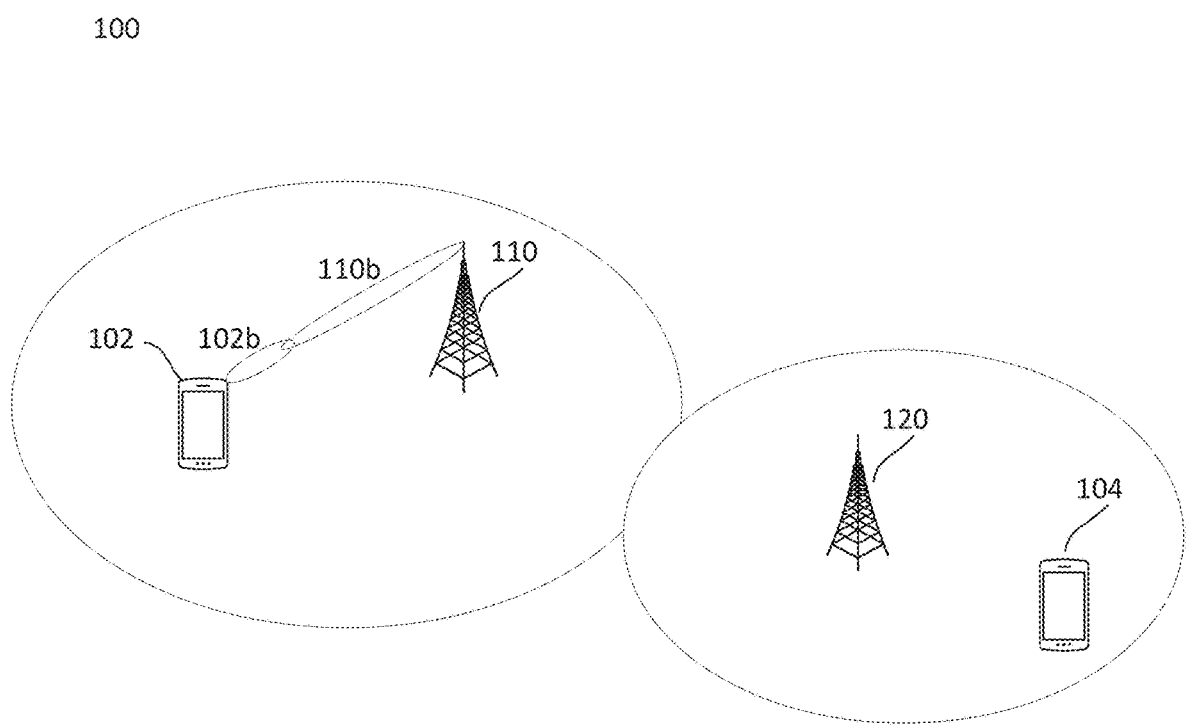
FIG. 1 exemplarily shows a radio communication network according to some aspects.

TAS mechanisms implemented in the physical layer (PHY) or Medium Access Control layer (MAC) monitor the power used in device transmissions over a time period (e.g., an averaging window) and use this monitoring to determine a corresponding energy to compare to a TAS transmission (Tx) energy budget. The TAS Tx energy budget may include considerations to comply with SAR regulations issued by authorities or by standardization committees. For example, the TAS Tx energy budget may include an allowable amount of energy that is permitted to be used for data transmissions over a time period.

In this manner, TAS mechanisms are configured to compare the amount of spent energy to the TAS Tx energy budget for the time period and control the Tx power accordingly. In some aspects, this time period may be based on a geographic area (e.g., a country) and/or communication channel frequency band. For example, the time period may be in the range of 10 seconds, 30 seconds, 60 seconds, 100 seconds, or 6 minutes. The exact determination of the time period may depend on the geographic area (e.g., a country) and/or communication channel frequency band.

Generally, TAS mechanisms utilize schemes that aggregate power over the time period to exploit the allowed amount of transmission energy for the time period. In other words, TAS mechanisms may implement an averaging time as per regulatory definitions defined and perform an integral of the transmit power over the time period. This power integral may then be compared to the TAS Tx energy budget over time. However, this requires performing an integral over a sliding window corresponding to the regulatory time period. This sliding window integral requires the storage of the transmission power history (at least for the duration of the time period) and packet durations in resolutions set by the requirements of the sliding window movement. A higher sliding window movement resolution allows for more accurate and precise usage of the TAS Tx energy budget, albeit at a higher processing and memory capacity. A lower sliding window movement resolution requires larger safety margins on the spent Tx power budget so as not to violate regulations, thereby lowering throughput.

The methods and device presented herein offer schemes to implement TAS mechanisms without the need for the integral or sliding window, thereby reducing the memory resources and real-time processing needed for TAS mechanisms, all while complying with regulations.

In some aspects, the methods and devices of the present disclosure provide features to perform the TAS computations without the need for performing an integral of the Tx power over time and without the need for a sliding window. Instead, according to some aspects, instead of averaging the Tx power by an integral over time, the methods and devices of this disclosure set a power back-off (PBO) at a first limit so that transmission power does not exceed the first limit, where this first limit is below a pre-defined RF power limit (e.g., where the pre-defined RF power limit is determined according to SAR regulations); accumulate a difference in actual RF transmitted power spend transmitting data and the pre-defined RF power limit over a duration to produce an accumulated energy budget (while only using a single accumulator); and once the accumulated energy budget reaches a pre-defined energy credit value (e.g., a maximum credit value), remove the PBO and allow RF transmitter power exceeding the pre-defined RF power limit until the accumulated energy budget meets a threshold (e.g., until the energy budget is back to zero).

In other words, only a single accumulator is used for implementing the disclosure herein without using a more complex and memory-intensive integral function and/or a sliding window. The pre-defined energy credit value may be selected in order to prevent obsolete energy credit and ensure that the SAR limits imposed by regulations are not violated. In some aspects, the pre-defined energy credit value serves to limit the accumulated energy credit by saturation and/or a history time limit. The threshold may indicate that the accumulated energy budget has been consumed (or has reached a certain diminished, minimum level). By implementing these mechanisms, the devices and methods of the present disclosure are also able to exploit the TAS Tx energy budget more efficiently.

In some aspects, the present disclosure allows for SAR mechanisms and schemes that may be implemented with a single memory cell or register for a single accumulator as opposed to the traditional moving integral implementation that requires much more memory and logic resources. The memory and logic resources needed for the traditional moving integral implementation are highly dependent on the averaging duration and moving integral resolution. The present disclosure, therefore, provides SAR methods that may be implemented with reduced memory and logic resources.

The methods and devices of the present disclosure provide numerous advantages, including, but not limited to: transmitting the maximum energy allowed by regulations or standardization bodies; proving high processing resolution; avoiding violations of regulatory or standardized limits; and reduced processing and memory usage attributed to not needing to perform integral functions or implement a sliding window. Furthermore, these methods and devices herein allow for maximization of transmitter power, increasing data throughput and connectivity range while improving cell and spectral density of wireless cells.

The following detailed description refers to the accompanying drawings that show, by way of illustration, specific details and aspects in which the disclosure may be practiced.

The word "exemplary" is used herein to mean "serving as an example, instance, or illustration". Any aspect or design described herein as "exemplary" is not necessarily to be construed as preferred or advantageous over other aspects or designs.

The words "plurality" and "multiple" in the description or the claims expressly refer to a quantity greater than one. The terms "group (of)", "set [of]", "collection (of)", "series (of)", "sequence (of)", "grouping (of)", etc., and the like in the description or in the claims refer to a quantity equal to or greater than one, i.e. one or more. Any term expressed in plural form that does not expressly state "plurality" or "multiple" likewise refers to a quantity equal to or greater than one. The terms "proper subset", "reduced subset", and "lesser subset" refer to a subset of a set that is not equal to the set, i.e. a subset of a set that contains less elements than the set.

Any vector and/or matrix notation utilized herein is exemplary in nature and is employed solely for purposes of explanation. Accordingly, aspects of this disclosure accompanied by vector and/or matrix notation are not limited to being implemented solely using vectors and/or matrices, and that the associated processes and computations may be equivalently performed with respect to sets, sequences, groups, etc., of data, observations, information, signals, samples, symbols, elements, etc.

As used herein, "memory" is understood as a non-transitory computer-readable medium in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, etc., or any combination thereof. Furthermore, registers, shift registers, processor registers, data buffers, etc., are also embraced herein by the term memory. A single component referred to as "memory" or "a memory" may be composed of more than one different type of memory, and thus may refer to a collective component including one or more types of memory. Any single memory component may be separated into multiple collectively equivalent memory components, and vice versa. Furthermore, while memory may be depicted as separate from one or more other components (such as in the drawings), memory may also be integrated with other components, such as on a common integrated chip or a controller with an embedded memory.

The term "software" refers to any type of executable instruction, including firmware.

The term "terminal device" utilized herein refers to user-side devices (both portable and fixed) that can connect to a core network and/or external data networks via a radio access network. "Terminal device" can include any mobile or immobile wireless communication device, including User Equipment (UE), Mobile Stations (MSs), Stations (STAs), cellular phones, tablets, laptops, personal computers, wearables, multimedia playback and other handheld or body-mounted electronic devices, consumer/home/office/commercial appliances, vehicles, and any other electronic device capable of user-side wireless communications. Without loss of generality, in some cases terminal devices can also include application-layer components, such as application processors or other general processing components that are directed to functionality other than wireless communications. Terminal devices can optionally support wired communications in addition to wireless communications. Furthermore, terminal devices can include vehicular communication devices that function as terminal devices.

The term "network access node" as utilized herein refers to a network-side device that provides a radio access network with which terminal devices can connect and exchange information with a core network and/or external data networks through the network access node. "Network access nodes" can include any type of base station or access point, including macro base stations, micro base stations, NodeBs, evolved NodeBs (eNBs), Home base stations, Remote Radio Heads (RRHs), relay points, Wireless Local Area Network (WLAN) Access Points (APs), Bluetooth master devices, DSRC RSUs, terminal devices acting as network access nodes, and any other electronic device capable of network-side wireless communications, including both immobile and mobile devices (e.g., vehicular network access nodes, moving cells, and other movable network access nodes). As used herein, a "cell" in the context of telecommunications may be understood as a sector served by a network access node. Accordingly, a cell may be a set of geographically co-located antennas that correspond to a particular sectorization of a network access node. A network access node can thus serve one or more cells (or sectors), where the cells are characterized by distinct communication channels. Furthermore, the term "cell" may be utilized to refer to any of a macrocell, microcell, femtocell, picocell, etc. Certain communication devices can act as both terminal devices and network access nodes, such as a terminal device that provides network connectivity for other terminal devices.

Various aspects of this disclosure may utilize or be related to radio communication technologies. While some examples may refer to specific radio communication technologies, the examples provided herein may be similarly applied to various other radio communication technologies, both existing and not yet formulated, particularly in cases where such radio communication technologies share similar features as disclosed regarding the following examples. As used herein, a first radio communication technology may be different from a second radio communication technology if the first and second radio communication technologies are based on different communication standards.

Aspects described herein may use such radio communication technologies according to various spectrum management schemes, including, but not limited to, dedicated licensed spectrum, unlicensed spectrum, (licensed) shared spectrum (such as LSA, "Licensed Shared Access," in 2.3-2.4 GHz, 3.4-3.6 GHz, 3.6-3.8 GHz and further frequencies and SAS, "Spectrum Access System," in 3.55-3.7 GHz and further frequencies), and may be use various spectrum bands including, but not limited to, IMT (International Mobile Telecommunications) spectrum (including 450-470 MHz, 790-960 MHz, 1710-2025 MHz, 2110-2200 MHz, 2300-2400 MHz, 2500-2690 MHz, 698-790 MHz, 610-790 MHz, 3400-3600 MHz, etc., where some bands may be limited to specific region(s) and/or countries), IMT-advanced spectrum, IMT-2020 spectrum (expected to include 3600-3800 MHz, 3.5 GHz bands, 700 MHz bands, bands within the 24.25-86 GHz range, etc.), spectrum made available under FCC's "Spectrum Frontier" 5G initiative (including 27.5-28.35 GHz, 29.1-29.25 GHz, 31-31.3 GHz, 37-38.6 GHz, 38.6-40 GHz, 42-42.5 GHz, 57-64 GHz, 64-71 GHz, 71-76 GHz, 81-86 GHz and 92-94 GHz, etc.), the ITS (Intelligent Transport Systems) band of 5.9 GHz (typically 5.85-5.925 GHz) and 63-64 GHz, bands currently allocated to WiGig such as WiGig Band 1 (57.24-59.40 GHz), WiGig Band 2 (59.40-61.56 GHz) and WiGig Band 3 (61.56-63.72 GHz) and WiGig Band 4 (63.72-65.88 GHz), the 70.2 GHz71 GHz band, any band between 65.88 GHz and 71 GHz, bands currently allocated to automotive radar applications such as 76-81 GHz, and future bands including 94-300 GHz and above.

For purposes of this disclosure, radio communication technologies may be classified as one of a Short-Range radio communication technology or Cellular Wide Area radio communication technology. Short Range radio communication technologies may include Bluetooth, WLAN (e.g., according to any IEEE 802.11 standard), and other similar radio communication technologies. Cellular Wide Area radio communication technologies may include Global System for Mobile Communications (GSM), Code Division Multiple Access 2000 (CDMA2000), Universal Mobile Telecommunications System (UMTS), Long Term Evolution (LTE), General Packet Radio Service (GPRS), Evolution-Data Optimized (EV-DO), Enhanced Data Rates for GSM Evolution (EDGE), High Speed Packet Access (HSPA; including High Speed Downlink Packet Access (HSDPA), High Speed Uplink Packet Access (HSUPA), HSDPA Plus (HSDPA+), and HSUPA Plus (HSUPA+)), Worldwide Interoperability for Microwave Access (WiMax) (e.g., according to an IEEE 802.16 radio communication standard, e.g., WiMax fixed or WiMax mobile), etc., and other similar radio communication technologies. Cellular Wide Area radio communication technologies also include "small cells" of such technologies, such as microcells, femtocells, and picocells. Cellular Wide Area radio communication technologies may be generally referred to herein as "cellular" communication technologies.

The terms "radio communication network," "wireless network", "communication network," or the like, as utilized herein encompasses both an access section of a network (e.g., a radio access network (RAN) section) and a core section of a network (e.g., a core network section). The term "radio idle mode" or "radio idle state" used herein in reference to a terminal device refers to a radio control state in which the terminal device is not allocated at least one dedicated communication channel of a mobile communication network. The term "radio connected mode" or "radio connected state" used in reference to a terminal device refers to a radio control state in which the terminal device is allocated at least one dedicated uplink communication channel of a radio communication network.

Unless explicitly specified, the term "transmit" encompasses both direct (point-to-point) and indirect transmission (via one or more intermediary points). Similarly, the term "receive" encompasses both direct and indirect reception. Furthermore, the terms "transmit", "receive", "communicate", and other similar terms encompass both physical transmission (e.g., the transmission of radio signals) and logical transmission (e.g., the transmission of digital data over a logical software-level connection). For example, a processor or controller may transmit or receive data over a software-level connection with another processor or controller in the form of radio signals, where the physical transmission and reception is handled by radio-layer components such as RF transceivers and antennas, and the logical transmission and reception over the software-level connection is performed by the processors or controllers. The term "communicate" may encompass one or both of transmitting and receiving, i.e., unidirectional or bidirectional communication in one or both of the incoming and outgoing directions. The term "calculate" may encompass both 'direct' calculations via a mathematical expression/formula/relationship and 'indirect' calculations via lookup or hash tables and other array indexing or searching operations.

Figure 2:
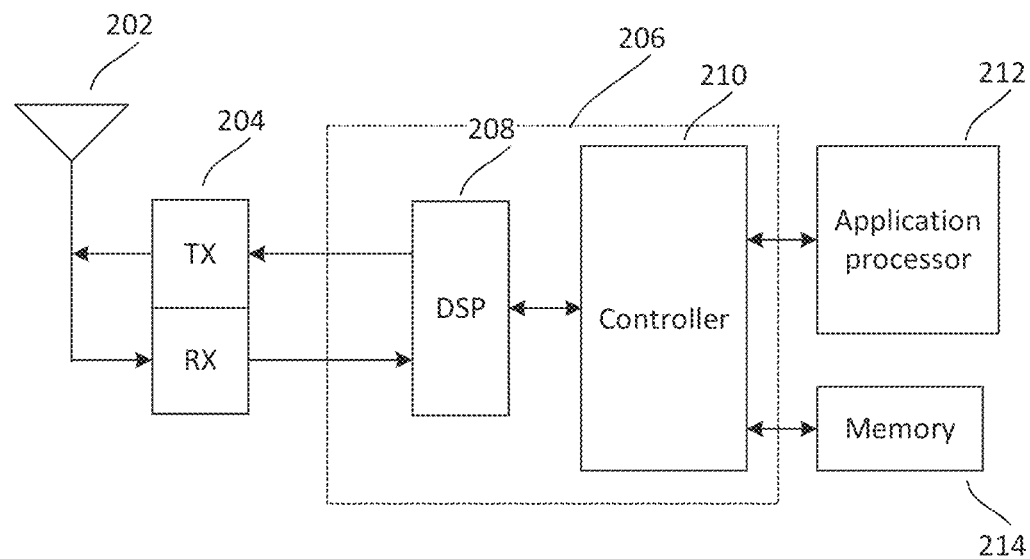
FIG. 2 exemplarily shows an internal configuration of terminal device according to some aspects.

FIGS. 1 and 2 depict an exemplary network and device architecture for wireless communications. In particular, FIG. 1 shows exemplary radio communication network 100 according to some aspects, which may include terminal devices 102 and 104 and network access nodes 110 and 120. Radio communication network 100 may communicate with terminal devices 102 and 104 via network access nodes 110 and 120 over a radio access network. Although certain examples described herein may refer to a particular radio access network context (e.g., 5G, NR, LTE, or other 3rd Generation Partnership Project (3GPP) networks, WLAN/Wi-Fi, Bluetooth, mmWave, etc.), these examples are demonstrative and may therefore be readily applied to any other type or configuration of radio access network. The number of network access nodes and terminal devices in radio communication network 100 is exemplary and is scalable to any amount.

In an exemplary cellular context, network access nodes 110 and 120 may be base stations (e.g., eNodeBs, NodeBs, Base Transceiver Stations (BTSs), or any other type of base station), while terminal devices 102 and 104 may be cellular terminal devices (e.g., Mobile Stations (MSs), User Equipment (UE), or any type of cellular terminal device). Network access nodes 110 and 120 may therefore interface (e.g., via backhaul interfaces) with a cellular core network such as an Evolved Packet Core (EPC, for LTE), Core Network (CN, for UMTS), or other cellular core networks, which may also be considered part of radio communication network 100. The cellular core network may interface with one or more external data networks. In an exemplary short-range context, network access node 110 and 120 may be access points (APs, e.g., WLAN or WLAN APs), while terminal device 102 and 104 may be short range terminal devices (e.g., stations (STAs)). Network access nodes 110 and 120 may interface (e.g., via an internal or external router) with one or more external data networks.

Network access nodes 110 and 120 (and, optionally, other network access nodes of radio communication network 100 not explicitly shown in FIG. 1) may accordingly provide a radio access network to terminal devices 102 and 104 (and, optionally, other terminal devices of radio communication network 100 not explicitly shown in FIG. 1). In an exemplary cellular context, the radio access network provided by network access nodes 110 and 120 may enable terminal devices 102 and 104 to wirelessly access the core network via radio communications. The core network may provide switching, routing, and transmission for traffic data related to terminal devices 102 and 104 and may further provide access to various internal data networks (e.g., control nodes, routing nodes that transfer information between other terminal devices on radio communication network 100, etc.) and external data networks (e.g., data networks providing voice, text, multimedia (audio, video, image), and other Internet and application data). In an exemplary short-range context, the radio access network provided by network access nodes 110 and 120 may provide access to internal data networks (e.g., for transferring data between terminal devices connected to radio communication network 100) and external data networks (e.g., data networks providing voice, text, multimedia (audio, video, image), and other Internet and application data).

The radio access network and core network (if applicable, such as for a cellular context) of radio communication network 100 may be governed by communication protocols that can vary depending on the specifics of radio communication network 100. Such communication protocols may define the scheduling, formatting, and routing of both user and control data traffic through radio communication network 100, which includes the transmission and reception of such data through both the radio access and core network domains of radio communication network 100. Accordingly, terminal devices 102 and 104 and network access nodes 110 and 120 may follow the defined communication protocols to transmit and receive data over the radio access network domain of radio communication network 100, while the core network may follow the defined communication protocols to route data within and outside of the core network. Exemplary communication protocols include LTE, UMTS, GSM, WiMAX, Bluetooth, WLAN, mmWave, etc., any of which may be applicable to radio communication network 100.

As shown in radio communication network 100, terminal device 102 and network access node 110 may each use beamforming techniques 102b and 110b, respectively, for communicating with one another. Each may both have at least one RF chain and multi-antenna arrays. Accordingly, the devices shown in network 100 may be capable of bidirectional beamforming. If a user is in the direction of the beam 102b, for example, the user may be subject to increased SAR levels. In order to comply with regulatory measures, terminal device 102 may need to implement TAS mechanisms so that the amount of energy transmitted in the direction of the user does not violate (i.e., go over) a TAS energy budget for a given period of time. However, in addition to complying with these regulatory measures, terminal device 102 must also attempt to maintain a robust wireless link with network access node 110 to ensure communication quality is not degraded.

FIG. 2 shows an internal configuration of terminal device 102 according to some aspects, which may include antenna system 202, radio frequency (RF) transceiver 204, baseband modem 206 (including digital signal processor 208 and protocol controller 210), application processor 212, and memory 214. Although not explicitly shown in FIG. 2, in some aspects terminal device 102 may include one or more additional hardware and/or software components, such as processors/microprocessors, controllers/microcontrollers, other specialty or generic hardware/processors/circuits, peripheral device(s), memory, power supply, external device interface(s), subscriber identity module(s) (SIMs), user input/output devices (display(s), keypad(s), touchscreen(s), speaker(s), external button(s), camera(s), microphone(s), etc.), or other related components.

Terminal device 102 may transmit and receive radio signals on one or more radio access networks. Baseband modem 206 may direct such communication functionality of terminal device 102 according to the communication protocols associated with each radio access network and may execute control over antenna system 202 and RF transceiver 204 to transmit and receive radio signals according to the formatting and scheduling parameters defined by each communication protocol. Although various practical designs may include separate communication components for each supported radio communication technology (e.g., a separate antenna, RF transceiver, digital signal processor, and controller), for purposes of conciseness the configuration of terminal device 102 shown in FIG. 2 depicts only a single instance of such components.

Terminal device 102 may transmit and receive wireless signals with antenna system 202, which may be a single antenna or an antenna array that includes multiple antennas. In some aspects, antenna system 202 may additionally include analog antenna combination and/or beamforming circuitry. In the receive (RX) path, RF transceiver 204 may receive analog radio frequency signals from antenna system 202 and perform analog and digital RF front-end processing on the analog radio frequency signals to produce digital baseband samples (e.g., In-Phase/Quadrature (IQ) samples) to provide to baseband modem 206. RF transceiver 204 may include analog and digital reception components including amplifiers (e.g., Low Noise Amplifiers (LNAs)), filters, RF demodulators (e.g., RF IQ demodulators)), and analog-to-digital converters (ADCs), which RF transceiver 204 may utilize to convert the received radio frequency signals to digital baseband samples. In the transmit (TX) path, RF transceiver 204 may receive digital baseband samples from baseband modem 206 and perform analog and digital RF front-end processing on the digital baseband samples to produce analog radio frequency signals to provide to antenna system 202 for wireless transmission. RF transceiver 204 may thus include analog and digital transmission components including amplifiers (e.g., Power Amplifiers (PAs), filters, RF modulators (e.g., RF IQ modulators), and digital-to-analog converters (DACs), which RF transceiver 204 may utilize to mix the digital baseband samples received from baseband modem 206 and produce the analog radio frequency signals for wireless transmission by antenna system 202. In some aspects baseband modem 206 may control the radio transmission and reception of RF transceiver 204, including specifying the transmit and receive radio frequencies for operation of RF transceiver 204.

As shown in FIG. 2, baseband modem 206 may include digital signal processor 208, which may perform physical layer (PHY, Layer 1) transmission and reception processing to, in the transmit path, prepare outgoing transmit data provided by protocol controller 210 for transmission via RF transceiver 204, and, in the receive path, prepare incoming received data provided by RF transceiver 204 for processing by protocol controller 210. Digital signal processor 208 may be configured to perform one or more of error detection, forward error correction encoding/decoding, channel coding and interleaving, channel modulation/demodulation, physical channel mapping, radio measurement and search, frequency and time synchronization, antenna diversity processing, power control and weighting, rate matching/dematching, retransmission processing, interference cancelation, and any other physical layer processing functions. Digital signal processor 208 may be structurally realized as hardware components (e.g., as one or more digitally-configured hardware circuits or FPGAs), software-defined components (e.g., one or more processors configured to execute program code defining arithmetic, control, and I/O instructions (e.g., software and/or firmware) stored in a non-transitory computer-readable storage medium), or as a combination of hardware and software components. In some aspects, digital signal processor 208 may include one or more processors configured to retrieve and execute program code that defines control and processing logic for physical layer processing operations. In some aspects, digital signal processor 208 may execute processing functions with software via the execution of executable instructions. In some aspects, digital signal processor 208 may include one or more dedicated hardware circuits (e.g., ASICs, FPGAs, and other hardware) that are digitally configured to specific execute processing functions, where the one or more processors of digital signal processor 208 may offload certain processing tasks to these dedicated hardware circuits, which are known as hardware accelerators. Exemplary hardware accelerators can include Fast Fourier Transform (FFT) circuits and encoder/decoder circuits. In some aspects, the processor and hardware accelerator components of digital signal processor 208 may be realized as a coupled integrated circuit.

Terminal device 102 may be configured to operate according to one or more radio communication technologies. Digital signal processor 208 may be responsible for lower-layer processing functions (e.g., Layer 1/PHY) of the radio communication technologies, while protocol controller 210 may be responsible for upper-layer protocol stack functions (e.g., Data Link Layer/Layer 2 and/or Network Layer/Layer 3). Protocol controller 210 may thus be responsible for controlling the radio communication components of terminal device 102 (antenna system 202, RF transceiver 204, and digital signal processor 208) in accordance with the communication protocols of each supported radio communication technology, and accordingly may represent the Access Stratum and Non-Access Stratum (NAS) (also encompassing Layer 2 and Layer 3) of each supported radio communication technology. Protocol controller 210 may be structurally embodied as a processor configured to execute protocol stack software (retrieved from a controller memory) and subsequently control the radio communication components of terminal device 102 to transmit and receive communication signals in accordance with the corresponding protocol stack control logic defined in the protocol stack software. Protocol controller 210 may include one or more processors configured to retrieve and execute program code that defines the upper-layer protocol stack logic for one or more radio communication technologies, which can include Data Link Layer/Layer 2 and Network Layer/Layer 3 functions. Protocol controller 210 may be configured to perform both user-plane and control-plane functions to facilitate the transfer of application layer data to and from radio terminal device 102 according to the specific protocols of the supported radio communication technology. User-plane functions can include header compression and encapsulation, security, error checking and correction, channel multiplexing, scheduling and priority, while control-plane functions may include setup and maintenance of radio bearers. The program code retrieved and executed by protocol controller 210 may include executable instructions that define the logic of such functions.

In some aspects, terminal device 102 may be configured to transmit and receive data according to multiple radio communication technologies. Accordingly, in some aspects, one or more of antenna system 202, RF transceiver 204, digital signal processor 208, and protocol controller 210 may include separate components or instances dedicated to different radio communication technologies and/or unified components that are shared between different radio communication technologies. For example, in some aspects protocol controller 210 may be configured to execute multiple protocol stacks, each dedicated to a different radio communication technology and either at the same processor or different processors. In some aspects, digital signal processor 208 may include separate processors and/or hardware accelerators that are dedicated to different respective radio communication technologies, and/or one or more processors and/or hardware accelerators that are shared between multiple radio communication technologies. In some aspects, RF transceiver 204 may include separate RF circuitry sections dedicated to different respective radio communication technologies, and/or RF circuitry sections shared between multiple radio communication technologies. In some aspects, antenna system 202 may include separate antennas dedicated to different respective radio communication technologies, and/or antennas shared between multiple radio communication technologies. Accordingly, while antenna system 202, RF transceiver 204, digital signal processor 208, and protocol controller 210 are shown as individual components in FIG. 2, in some aspects antenna system 202, RF transceiver 204, digital signal processor 208, and/or protocol controller 210 may encompass separate components dedicated to different radio communication technologies.

The terminal device 102 may also include application processor 212 and memory 214. Application processor 212 may be a CPU and may be configured to handle the layers above the protocol stack, including the transport and application layers. Application processor 212 may be configured to execute various applications and/or programs of terminal device 102 at an application layer of terminal device 102, such as an operating system (OS), a user interface (UI) for supporting user interaction with terminal device 102, and/or various user applications. The application processor may interface with baseband modem 206 and act as a source (in the transmit path) and a sink (in the receive path) for user data, such as voice data, audio/video/image data, messaging data, application data, basic Internet/web access data, etc. In the transmit path, protocol controller 210 may therefore receive and process outgoing data provided by application processor 212 according to the layer-specific functions of the protocol stack and provide the resulting data to digital signal processor 208. Digital signal processor 208 may then perform physical layer processing on the received data to produce digital baseband samples, which digital signal processor may provide to RF transceiver 204. RF transceiver 204 may then process the digital baseband samples to convert the digital baseband samples to analog RF signals, which RF transceiver 204 may wirelessly transmit via antenna system 202. In the receive path, RF transceiver 204 may receive analog RF signals from antenna system 202 and process the analog RF signals to obtain digital baseband samples. RF transceiver 204 may provide the digital baseband samples to digital signal processor 208, which may perform physical layer processing on the digital baseband samples. Digital signal processor 208 may then provide the resulting data to protocol controller 210, which may process the resulting data according to the layer-specific functions of the protocol stack and provide the resulting incoming data to application processor 212. Application processor 212 may then handle the incoming data at the application layer, which can include execution of one or more application programs with the data and/or presentation of the data to a user via a user interface.

Memory 214 may embody a memory component of terminal device 102, such as a hard drive or another such permanent memory device. Although not explicitly depicted in FIG. 2, the various other components of terminal device 102 shown in FIG. 2 may additionally each include integrated permanent and non-permanent memory components, such as for storing software program code, buffering data, etc.

In accordance with some radio communication networks, terminal devices 102 and 104 may execute mobility procedures to connect to, disconnect from, and switch between available network access nodes of the radio access network of radio communication network 100. As each network access node of radio communication network 100 may have a specific coverage area, terminal devices 102 and 104 may be configured to select and re-select between the available network access nodes in order to maintain a strong radio access connection with the radio access network of radio communication network 100. For example, terminal device 102 may establish a radio access connection with network access node 110 while terminal device 104 may establish a radio access connection with network access node 120. In the event that the current radio access connection degrades, terminal devices 102 or 104 may seek a new radio access connection with another network access node of radio communication network 100; for example, terminal device 104 may move from the coverage area of network access node 120 into the coverage area of network access node 110. As a result, the radio access connection with network access node 120 may degrade, which terminal device 104 may detect via radio measurements such as signal strength or signal quality measurements of network access node 120.

Figure 3:
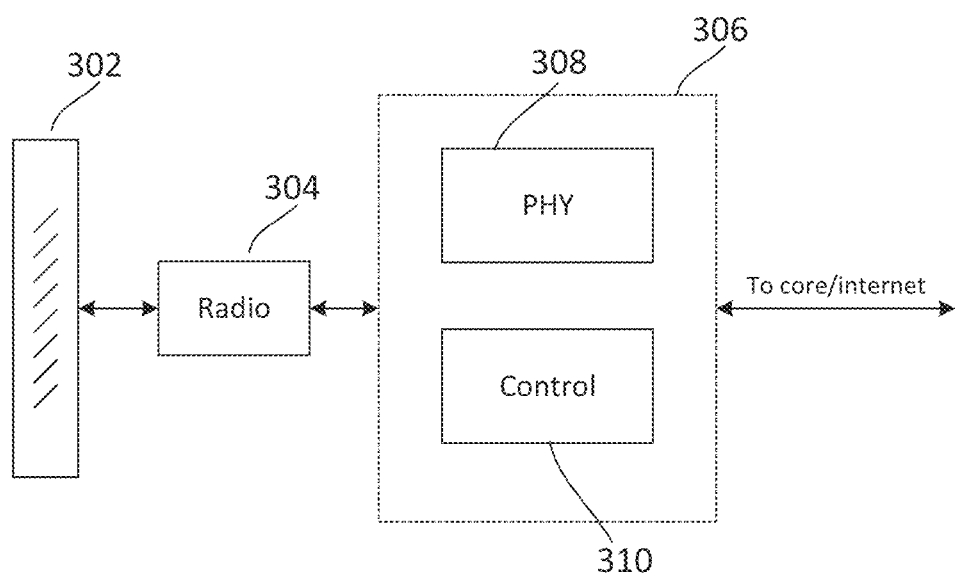
FIG. 3 exemplarily shows an internal configuration of a network access node according to some aspects.

FIG. 3 shows an exemplary internal configuration of a network access node, such as network access node 110, according to some aspects. As shown in FIG. 3, network access node 110 may include antenna system 302, radio transceiver 304, and baseband subsystem 306 (including physical layer processor 308 and protocol controller 310). In an abridged overview of the operation of network access node 110, network access node 110 may transmit and receive wireless signals via antenna system 302, which may be an antenna array including multiple antennas. Radio transceiver 304 may perform transmit and receive RF processing to convert outgoing baseband samples from baseband subsystem 306 into analog radio signals to provide to antenna system 302 for radio transmission and to convert incoming analog radio signals received from antenna system 302 into baseband samples to provide to baseband subsystem 306. Physical layer processor 308 may be configured to perform transmit and receive PHY processing on baseband samples received from radio transceiver 304 to provide to controller 310 and on baseband samples received from controller 310 to provide to radio transceiver 304. Controller 310 may control the communication functionality of network access node 110 according to the corresponding radio communication technology protocols, which may include exercising control over antenna system 302, radio transceiver 304, and physical layer processor 308. Each of radio transceiver 304, physical layer processor 308, and controller 310 may be structurally realized with hardware (e.g., with one or more digitally-configured hardware circuits or FPGAs), as software (e.g., as one or more processors executing program code defining arithmetic, control, and I/O instructions stored in a non-transitory computer-readable storage medium), or as a mixed combination of hardware and software. In some aspects, radio transceiver 304 may be a radio transceiver including digital and analog radio frequency processing and amplification circuitry. In some aspects, radio transceiver 304 may be a software-defined radio (SDR) component implemented as a processor configured to execute software-defined instructions that specify radio frequency processing routines. In some aspects, physical layer processor 308 may include a processor and one or more hardware accelerators, where the processor is configured to control physical layer processing and offload certain processing tasks to the one or more hardware accelerators. In some aspects, controller 310 may be a controller configured to execute software-defined instructions that specify upper-layer control functions. In some aspects, controller 310 may be limited to radio communication protocol stack layer functions, while in other aspects controller 310 may also be configured for transport, internet, and application layer functions.

Network access node 110 may thus provide the functionality of network access nodes in radio communication networks by providing a radio access network to enable served terminal devices to access communication data. For example, network access node 110 may also interface with a core network, one or more other network access nodes, or various other data networks and servers via a wired or wireless backhaul interface.

In some aspects, the present disclosure provides TAS mechanisms that may be implemented in the Medium Access Control (MAC) and/or PHY layers in order to comply with SAR regulatory limits. The TAS mechanisms of the present disclosure allow for a device to transmit above a fixed non-averaged SAR power level by granting an unused energy credit from the recent past or by accumulating a credit by transmitting at an energy deficit and handling it in time by implementing certain maximum energy credit values and/or thresholds to not violate the regulatory limits.

Figure 4:
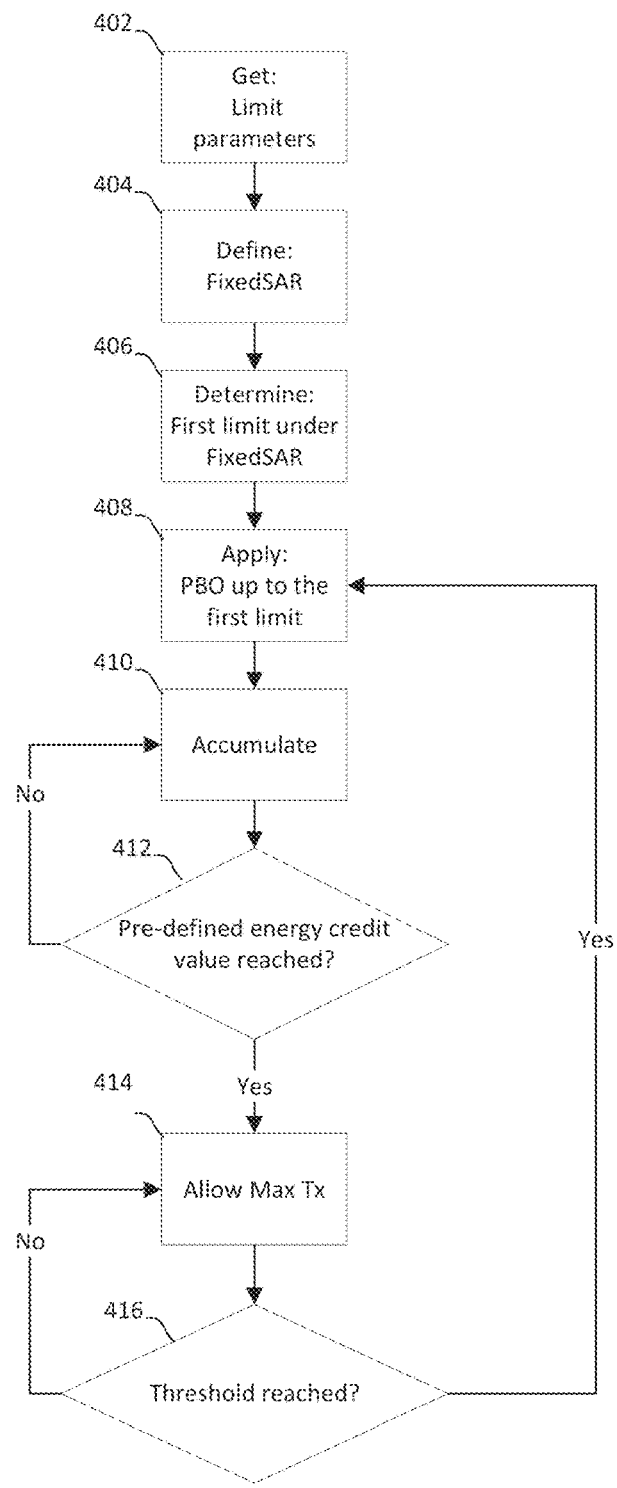
FIG. 4 exemplarily shows a flowchart according to some aspects.

FIG. 4 shows a flowchart 400 describing a method according to some aspects. It is appreciated that flowchart 400 is exemplary in nature and may thus be simplified for purposes of this explanation.

In some aspects, the TAS mechanism of the present disclosure may be initiated whenever a device receives an indication that it should operate under SAR restrictions. This may be received, for example, whenever the device is communicating at a certain frequency or in a certain frequency band within a geographical area governed by regulations (e.g., in the United States, this may include operating in certain frequency channels that must comply with FCC regulations).

The method may include obtaining limit parameters in 402. In some aspects, these limit parameters may include a total allowed amount of Tx energy, a time period, and/or a SAR Tx power limit. The limit parameters may, for example, depend on a specific channel, geographic location (e.g., country), and/or channel bandwidth. In other aspects, the limit parameters may include if the device has a preset Tx power limit it must not violate when the device is not using TAS mechanisms, for example.

In 404, the fixed SAR limit (FixedSAR) may be defined. The FixedSAR may correspond to the pre-defined RF power limit. If the SAR Tx power limit is included in the limit parameters obtained in 402, then the SAR Tx power limit may be used as the FixedSAR. Or, if a total allowed amount of Tx energy and a time period in order to comply with SAR regulations are provided, the FixedSAR may be computed by dividing the total allowed amount of Tx energy by the duration value of the time period. In some aspects, the FixedSAR may be a fixed Tx power limit when there is no TAS mechanism to comply with SAR regulatory limits. In other words, FixedSAR may be the limit whenever there no TAS mechanism (e.g., either implemented by a moving integral and/or sliding window, or by the methods described herein) is enabled. This may correspond to a preset Tx power limit that the device must not violate when the device is not using TAS mechanisms.

In some aspects, FixedSAR is a RF Tx power limit that is provided so that a device will not violate SAR regulatory limits when no TAS mechanism is enabled at the device. By imposing such a limit, the device is able to ensure that it does not violate SAR regulatory limits even when it has not activated or is using a TAS mechanism. Accordingly, if a power limit (i.e., a first limit) is set below this FixedSAR limit, then a device will ensure that it does not violate SAR regulatory limits while it transmits below the FixedSAR. Accordingly, FixedSAR may be a RF Tx power limit that is already defined for a device (i.e., it is a pre-defined power limit) to implement when no TAS mechanism is enabled or utilized.

In 406, a first limit under the FixedSAR is determined. This first limit may be implemented by a PBO that will provide an upper limit that caps the transmission power able to be used by a transmitter. In other words, a PBO is applied to the transmitter power so that the transmission power is restricted under the first limit, where the first limit itself is under the FixedSAR determined in 404. The amount that the first limit is under the FixedSAR may be determined based on a deficit rate. This deficit rate may be selected depending on one or more parameters, such as the value of the FixedSAR, other SAR considerations (e.g., the regulatory time period), channel conditions, etc. In some aspects, the deficit rate may be selected based on a certain percentage of the FixedSAR. For example, the deficit rate may be selected so that the first limit is at 90% the value of FixedSAR. The larger the deficit rate, the greater the PBO will be below the pre-defined RF power limit (e.g., FixedSAR). A higher deficit rate allows for longer times of transmissions with no limits, but with a bigger PBO when the PBO is applied. In some aspects, the deficit rate is selected such that the applied PBO limits RF transmitter power to a first limit such that is right below the pre-defined RF power limit such that there is minimal difference in performance compared to transmitting at the pre-defined RF power limit.

In 408, a PBO restricting transmission power up to the first limit is applied. In some aspects, the PBO may be imposed over a pre-defined time period which may be determined based on a maximum averaging duration allowed by regulations. In some aspects, this PBO at the first limit may also be set as the default transmission power limit when there is no energy credit remaining.

After the PBO at the first limit is imposed, the device may begin to accumulate a budget of "unused" transmission energy credit in 410. The amount of energy accumulated may correspond to a difference under the amount allowed by SAR regulations. The total energy credit accumulated may be in the amount of the time period (e.g., in part, based on an averaging window duration, AvgDuration) multiplied by a difference of the FixedSAR minus the first limit, i.e., Total Energy Credit=AvgDuration*(FixedSAR-first limit). However, it is understood that this is operating under the assumption that the transmission power is maintained up to the first limit (i.e., at maximum power allowed by the PBO up to the first limit). The energy credit may be accumulated faster if the transmission power is below the first limit or if no packets are being transferred at a given moment (e.g., a time back-off is imposed due to other considerations such as chip temperature or congestion). Accordingly, in general, the amount of energy credit accumulated at any given instant (x) may be defined as: Energy Credit (x)=FixedSAR−ActualTxPwr(x), where the ActualTxPwr(x) is the actual transmission power at (x) and has a value that is capped at the first limit.

The accumulation of this energy credit is implemented by the TAS mechanism of the present disclosure instead of an integral function. For purposes of this explanation, the function that accumulates this energy credit will be called a Credit Accumulator (CAcc). The CAcc may be a counter that counts the unused energy and sums it over time. In other words, the CAcc adds underused power (FixedSAR−ActualTxPwr(x)) in the form of an energy credit to the budget over time. Over a duration, therefore, the added budget is equal to the time passed multiplied by the difference between FixedSAR and the actual Tx power, and may be illustrated as: CAcc (x+Δt)=CAcc (x)+(FixedSAR−ActualTxPwr)*Δt. The (FixedSAR−ActualTxPwr)*Δt value is, therefore, the amount of energy added to the budget (Added Budget) when the ActualTxPwr is lower that the FixedSAR.

In some aspects, this counter may count up when energy is added to the budget (i.e., ActualTxPwr is lower than the FixedSAR) and down when more energy is removed from the budget (i.e., ActualTxPwr is higher than the FixedSAR), but it is appreciated that this counting may be performed in the opposite manner.

This energy credit may be accumulated until the energy credit reaches a pre-defined energy credit value 412. Once the pre-defined energy credit value is reached, the TAS mechanism may allow maximum device transmission power 414. The maximum device transmission power may be higher than FixedSAR.

This pre-defined energy credit value (e.g., maximum energy credit value) may be determined based on a number of considerations, including, for example, a regulatory time period and/or based on the deficit rate. In some aspects, the pre-defined energy credit value serves to limit the accumulated energy credit by saturation and/or a history time limit.

In some aspects, the deficit rate is selected to derive the pre-defined energy credit value (i.e., the maximum energy credit value, max credit), or the pre-defined energy credit value is selected to derive the deficit rate.

In some aspects, the pre-defined energy credit value may be a maximum energy credit value providing an upper limit for the accumulated energy budget. The CAcc may incrementally accumulate energy credit up to this maximum energy credit. In other words, the CAcc accumulates the Added Budget by limiting the transmission power under the FixedSAR over time until it may no longer accumulate energy credit once it reaches the maximum energy credit limit. However, any energy credit in the CAcc indicates that the device may transmit over the FixedSAR based on the credit accumulated. In some aspects, the use of the maximum credit limit ensures that the system does not accumulate energy credit that is outdated, e.g., no energy credit may be accumulated that is older than the time period imposed by SAR regulations, or fluctuate too quickly between applying and removing the PBO. By defining the maximum energy credit in this manner, the TAS mechanism of the present disclosure limits ensures that the amount of transmitted energy does not surpass the limits imposed by regulations.

In some aspects, the pre-defined limit may be any positive value. In this manner, any time there is energy credit in the CAcc, the device may use a higher transmission power while still complying with SAR transmission energy considerations.

The device may allow maximum device transmission power until a threshold is reached 416. This threshold may be an energy or budget usage threshold. In some aspects, this may be the pre-defined energy credit value described in the present disclosure. In some aspects, this threshold indicates that the accumulated energy budget has been consumed, i.e., the CAcc has fallen to zero. This occurs due to the ActualTxPwr exceeding the FixedSAR (i.e., (FixedSAR−ActualTxPwr) is negative) which leads to a reduction in the energy credit accumulated by the CAcc. In some aspects, this threshold may be a value greater than zero to account for safety margins so as not to violate SAR regulatory limits.

Figure 5:
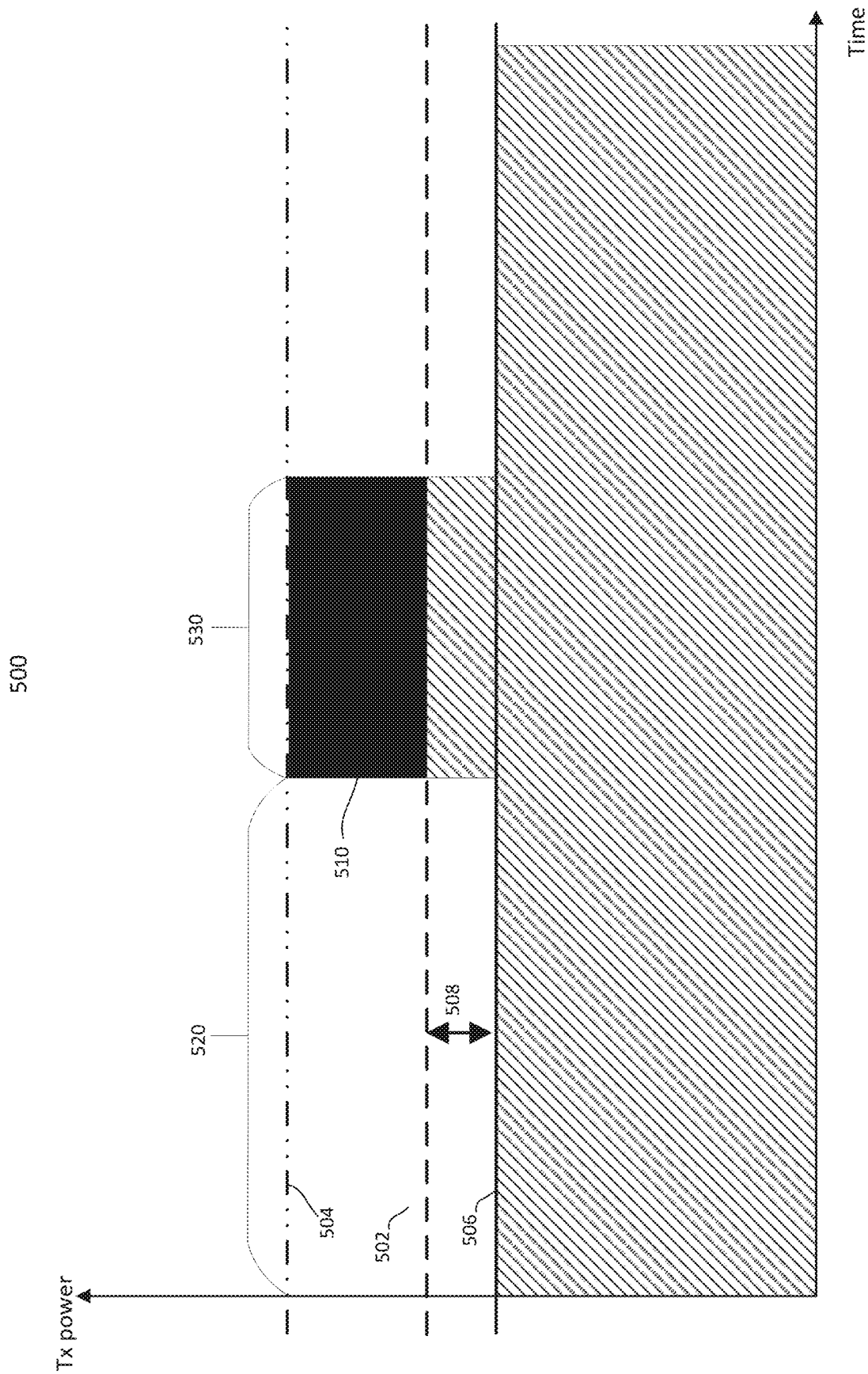
FIG. 5 exemplarily shows a graph illustrating an explanation of the method according to some aspects.

FIG. 5 is a graph 500 that illustrates the method described herein. It is appreciated that graph 500 is exemplary in nature and may thus be simplified for purposes of this explanation.

In graph 500, the x-axis represents time (e.g., in seconds, milliseconds, or microseconds) and the y-axis represents transmission (Tx) power (e.g., milliwatts or watts). The line marked 502 represents the pre-defined RF power limit, e.g., FixedSAR. The line marked by 504 represents the maximum transmission power of the device, i.e., there is no PBO applied to the transmitter. The line marked by 506 represents the first limit. As shown in graph 500, the first limit 506 is below the pre-defined RF limit 502. Additionally, line 506 represents the default Tx power limit when there is no energy credit remaining in the CAcc.

The shaded areas (both dark shading and shading with patterned lines) represent the actual transmission (Tx) power. In graph 500, the illustration is simplified where the actual Tx power is always at the first limit 506 during time period 520, but it is appreciated that this is only the upper limit, and lower Tx powers may be used. For example, if the Tx power is below the line marked by 506, then the CAcc may accumulate the energy credit faster, thereby reaching the maximum credit value sooner, and allowing the maximum transit power up to the line marked by 504 in a quicker manner.

During time period 520, the CAcc accumulates the energy credit as previously described. The amount of energy credit accumulated is the difference between 502 and the actual TX power which in graph 500 is illustrated by 508. At the end of time period 520, the accumulated energy credit reaches the pre-defined energy credit value threshold (e.g., the maximum energy credit value, as described with respect to 412). Accordingly, the PBO limiting the Tx power to 506 may be removed, and the maximum transmission power is allowed in 530, i.e., transmission power up to line 504. In graph 500, maximum transmission power up to 504 is shown during time period 530, but it is appreciated that this is for illustrative purposes and any transmission power below 504 may be included as well. During time period 530, the darker rectangle indicated by 510 illustrates the energy credit being consumed.

The end of time period 530 indicates the threshold described in 416 being reached. In other words, the energy credit accumulated by CAcc may have been consumed, i.e., it has reached zero. At this time, the PBO at the first limit 506 is reintroduced, and the process is performed again.

In some aspects, the methods described herein are further illustrated in equation form.

The total TAS Tx energy budget as allowed by regulations may be described as:

Total TAS Tx energy=FixedSAR*AvgDuration where the AvgDuration is determined based on the regulatory time period. From this equation, the FixedSAR limit (i.e., the pre-defined RF power limit, shown by 502) may be determined.

The total TAS Tx energy budget also establishes the energy limit over the time period which the TAS mechanisms of this disclosure must comply with in order to not violate regulations.

Total TAS Tx energy=(Firstlimit*AvgDuration+MaxCredit)

where Firstlimit is the first limit of transmission power imposed by the PBO below the FixedSAR (i.e., showed by line 506), and MaxCredit is the pre-defined energy credit value providing an upper limit to the accumulated energy budget.

The Firstlimit may therefore be expressed as:

$$Firstlimit = \frac{(FixedSAR * AvgDuration - MaxCredit)}{AvgDuration}$$

The MaxCredit may be set according to a function of a certain portion of the Total TAS Tx energy budget. This may be defined as the deficit rate (TAS_Deficit_Rate). The deficit rate may be selected based on numerous factors, including SAR parameter considerations, channel conditions, or the like. In selecting the deficit rate, the TAS mechanism is setting rate of collecting the energy credit that, once accumulated to the MaxCredit, allows the transmissions at maximum device power. The transmission at maximum device power, in turn, reduces the accumulated energy credit.

$$MaxCredit = \text{Total } TAS \ Tx \ \text{energy} * TAS_{Deficit \ Rate}$$

$$= FixedSAR * AvgDuration * TAS_{Deficit \ Rate}$$

where the MaxCredit, Total TAS Tx energy, and the Fixed Sar may be expressed in milliwatts (mW), and the TAS_Deficit_Rate may be a percentage, e.g., 50%-95%.

Setting the TAS_Deficit_Rate to a certain value (either fixed or as a function of other parameters such as changing channel conditions, e.g., congestion levels which may induce compulsory TBOs) provides the equation:

$$Firstlimit = \frac{\left(\begin{array}{c}FixedSAR*AvgDuration - \\ FixedSAR*AvgDuration*TAS_{Deficit\ Rate}\end{array}\right)}{AvgDuration}$$

which can be further simplified to:

$$Firstlimit = FixedSAR - FixedSAR*TAS_{Deficit\ Rate}$$

where the Firstlimit and the FixedSAR may be expressed in mW. As shown, then, the equation is not based on AvgDuration (i.e., not based on a sliding window) or an integral at all.

In other words, be setting the deficit rate, which provides how energy credit the device is allowed to accumulate, a simple constant PBO may be applied below the regulatory power limit (including power limits in non-TAS scenarios). This known constant PBO while the energy credit is accumulated ensures that the SAR regulatory measures are not violated, while allowing full exploitation of the allowable transmission energy as per regulations as well.

Figure 6:
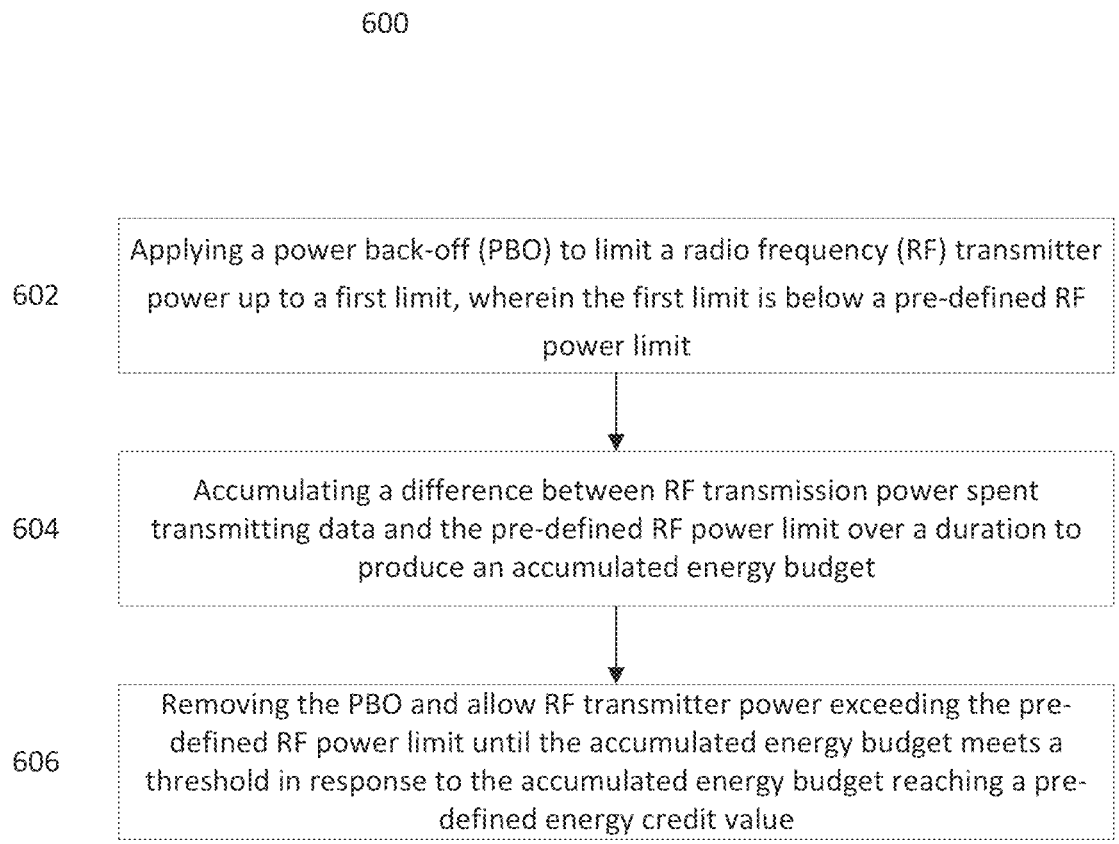
FIG. 6 exemplarily shows a flowchart according to some aspects.

FIG. 6 shows a flowchart 600 describing a method according to some aspects. It is appreciated that flowchart 600 is exemplary in nature and may thus be simplified for purposes of this explanation.

The method may include applying the PBO to limit RF transmitter power up to the first limit 602; accumulating a difference between RF transmission power spent in transmitting data and the pre-defined RF power limit over a duration to produce an accumulated energy budget 604; and removing the PBO and allowing RF transmitter power exceeding the pre-defined RF power limit until the accumulated energy budget for the respective iteration meets the threshold in response to the accumulated energy budget reaching a pre-defined energy credit value 606. In 604, the difference between the RF transmission power spent and the pre-defined RF power limit may be determined by subtracting the RF transmission power spent (i.e., ActualTxPwr) from the pre-defined RF power limit (i.e., FixedSAR). The pre-defined RF power limit may be based on an added budget as per SAR tables allowance. The accumulating of the difference may be performed up to a saturation limit which limits the credit from history that goes farther back in time beyond the moving average time window as per regulatory limits. In some aspects, the method may include other features described herein.

Figure 7:
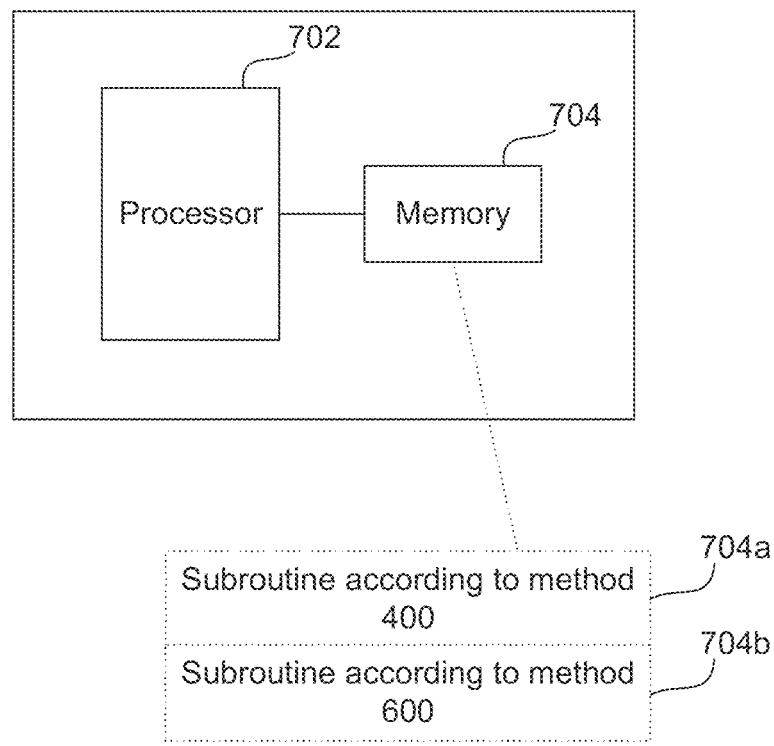
FIG. 7 exemplarily shows an internal configuration of baseband modem according to some aspects.

FIG. 7 shows an internal configuration of a baseband modem 206 according to some aspects. As shown in FIG. 7, the baseband modem of a terminal device may include processor(s) 702 and memory 704. Processor(s) 702 may be a single processor or multiple processors and may be configured to retrieve and execute program code to perform the methods described herein. For example, processor(s) 702 may be included in a baseband modem and/or an application processor of the terminal device. Processor(s) 702 may transmit and receive data over a software-level connection.

Memory 704 may be a non-transitory computer readable medium storing sub-routine instructions 704a, and/or 704b. Memory 704 may be a single memory or may be multiple memories and may be included as internal memories to processor(s) 702 or may be external to processor(s) 702. Memory 704 may be a non-transitory computer readable medium storing one or more sets subroutine instructions for executing one or more of the methods described herein, e.g., methods shown in flowcharts 400 or 600.

Figure 8:
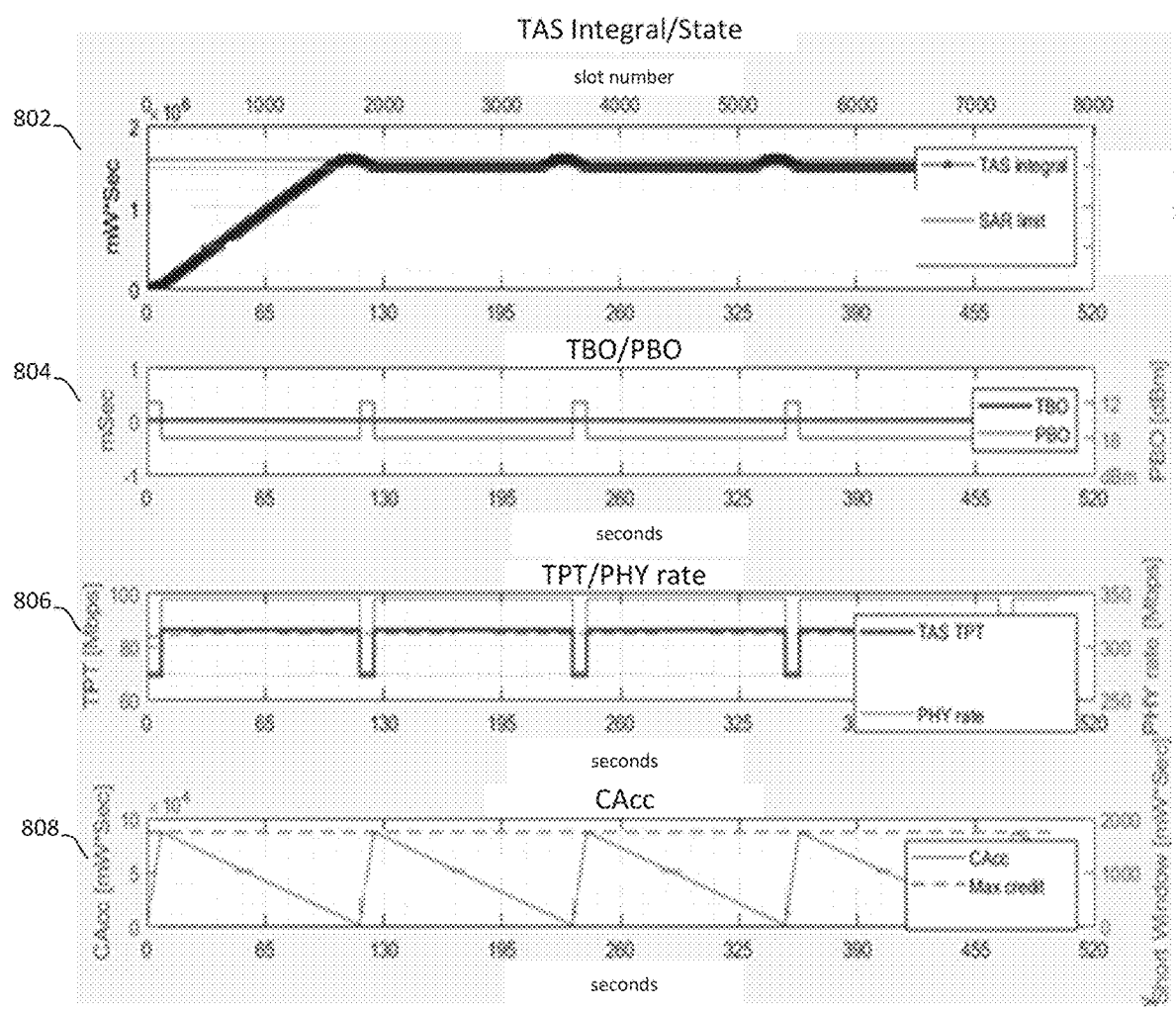
FIG. 8 exemplarily shows a series of graphs showing device behavior results according to some aspects.

FIG. 8 provides a series of graphs 802-808 illustrating the behavior of a device operating in accordance with the methods according to some aspects. The results are shown for a constant Tx with a duty of 30%. It is appreciated that graphs 802-808 are exemplary in nature for purposes of illustrating one or more of the aspects described herein.

Graph 808 shows the accumulator (CAcc) behavior and the max credit (i.e., the pre-defined energy credit value). As show, the CAcc starts at zero since no credit has yet been accumulated at time zero. It starts to gain credit when the PBO at the first limit is applied (PBO shown in 804). Once the CAcc accumulates energy credit up to Max credit, the PBO is removed (shown in 804), and the CAcc is consumed until it reaches zero, at which point the process repeats itself. In this example, the max credit is set to about $9*10^4$ mW*sec.

Graph 804 shows the PBO to set the transmission power to the first limit. As shown in relation to graph 808, whenever the CAcc is down to zero or below the pre-defined energy credit value (i.e., Max credit in this example). When the PBO line goes high, the transmission power at the first limit is set.

Graph 806 shows the effected throughput (TPT) and PHY rate. Whenever a PBO is applied, the TPT and PHY rate go down.

Graph 802 shows a virtual sliding window integral which may not be required by the methods and devices disclosed herein. However, graph 802 serves to illustrate that the methods described herein do not violate the SAR limit and that the transmission energy budget is exploited to its limit.

The following examples pertain to further aspects of this disclosure:

Example 1 is a device including a processor configured to: apply a power back-off (PBO) to limit a radio frequency (RF) transmitter power up to a first limit, where the first limit is below a pre-defined RF power limit; accumulate a difference between RF transmission power spent transmitting data and the pre-defined RF power limit over a duration to produce an accumulated energy budget; and once the accumulated energy budget reaches a pre-defined energy credit value, remove the PBO and allow RF transmitter power exceeding the pre-defined RF power limit until the accumulated energy budget meets a threshold. In some aspects, the pre-defined energy credit value serves to limit the accumulated energy credit by saturation and/or a history time limit. Once the pre-defined energy credit value is reached, the accumulation of the difference between the RF transmission power spent and the pre-defined RF power limit stops.

In Example 2, the subject matter of Example(s) 1 may include where after the accumulated energy budget meets the threshold, the processor is configured to perform subsequent iterations, each respective iteration of the subsequent iterations including: applying the PBO to limit RF transmitter power up to the first limit; accumulating a difference between RF transmission power spent transmitting data and the pre-defined RF power limit over a duration of the respective iteration to produce an accumulated energy budget for the respective iteration; and upon the accumulated energy budget for the respective iteration reaching the pre-defined energy credit value, removing the PBO and allowing RF transmitter power exceeding the pre-defined RF power limit until the accumulated energy budget for the respective iteration meets the threshold.

In Example 3, the subject matter of Example(s) 1-2 may include where the threshold indicates that the accumulated energy budget has been consumed.

In Example 4, the subject matter of Example(s) 1-3 may include where the pre-defined energy credit value is a maximum energy credit value providing an upper limit for the accumulated energy budget.

In Example 5, the subject matter of Example(s) 1-4 may include where the pre-defined RF power limit is based on a specific absorption rate (SAR) regulatory transmission power limit.

In Example 6, the subject matter of Example(s) 1-5 may include where the first limit is based on the SAR regulatory transmission power limit and a deficit rate.

In Example 7, the subject matter of Example(s) 1-6 may include where the maximum energy credit value is determined based on the SAR regulatory transmission power limit, a SAR regulatory time period, and/or the deficit rate.

In Example 8, the subject matter of Example(s) 1-7 may include where the deficit rate is based on a percentage of a SAR regulatory transmission energy budget, where the SAR regulatory transmission energy budget is based on the SAR regulatory transmission power limit and a SAR regulatory time period.

In Example 9, the subject matter of Example(s) 1-8 may include where the SAR regulatory time period is based on a geographic area and/or an RF band.

Example 10 is a device including means to apply a power back-off (PBO) to limit a radio frequency (RF) transmitter power up to a first limit, where the first limit is below a pre-defined RF power limit; means to accumulate a difference between RF transmission power spent transmitting data and the pre-defined RF power limit over a duration to produce an accumulated energy budget; and means to, once the accumulated energy budget reaches a pre-defined energy credit value, remove the PBO and allow RF transmitter power exceeding the pre-defined RF power limit until the accumulated energy budget meets a threshold.

Example 11 is a method including applying a power back-off (PBO) to limit a radio frequency (RF) transmitter power up to a first limit, where the first limit is below a pre-defined RF power limit; accumulating a difference between RF transmission power spent transmitting data and the pre-defined RF power limit over a duration to produce an accumulated energy budget; and once the accumulated energy budget reaches a pre-defined energy credit value, removing the PBO and allow RF transmitter power exceeding the pre-defined RF power limit until the accumulated energy budget meets a threshold. In some aspects, the accumulating of the difference may be performed up to a saturation limit (e.g., upon reaching the pre-defined energy credit value) which limits the credit from history that goes farther back in time beyond the moving average time window as per regulatory limits. In some aspects, the method further includes, once the pre-defined energy credit value is reached, stopping to accumulate the difference between the RF transmission power spent transmitting data and the pre-defined RF power limit.

In Example 12, the subject matter of Example(s) 11 may include where after the accumulated energy budget meets the threshold, further including performing subsequent iterations, each respective iteration of the subsequent iterations including: applying the PBO to limit RF transmitter power up to the first limit; accumulating a difference between RF transmission power spent transmitting data and the pre-defined RF power limit over a duration of the respective iteration to produce an accumulated energy budget for the respective iteration; and upon the accumulated energy budget for the respective iteration reaching the pre-defined energy credit value, removing the PBO and allowing RF transmitter power exceeding the pre-defined RF power limit until the accumulated energy budget for the respective iteration meets the threshold.

In Example 13, the subject matter of Example(s) 11 may include where the threshold indicates that the accumulated energy budget has been consumed. In some aspects, the threshold may be zero.

In Example 14, the subject matter of Example(s) 11 may include where the pre-defined energy credit value is a maximum energy credit value providing an upper limit for the accumulated energy budget.

In Example 15, the subject matter of Example(s) 11 may include where the pre-defined RF power limit is based on a specific absorption rate (SAR) regulatory transmission power limit.

In Example 16, the subject matter of Example(s) 11 may include where the first limit is based on the SAR regulatory transmission power limit and a deficit rate.

In Example 17, the subject matter of Example(s) 11 may include where the maximum energy credit value is determined based on the SAR regulatory transmission power limit, a SAR regulatory time period, and/or the deficit rate.

In Example 18, the subject matter of Example(s) 11 may include where the deficit rate is based on a percentage of a SAR regulatory transmission energy budget, where the SAR regulatory transmission energy budget is based on the SAR regulatory transmission power limit and a SAR regulatory time period.

In Example 19, the subject matter of Example(s) 11 may include where the SAR regulatory time period is based on a geographic area and/or an RF band.

Example 20 is one or more non-transitory computer readable media, including instructions, which when executed perform the method or realize the device as described in any preceding example.

While the above descriptions and connected figures may depict electronic device components as separate elements, skilled persons will appreciate the various possibilities to combine or integrate discrete elements into a single element. Such may include combining two or more circuits for form a single circuit, mounting two or more circuits onto a common chip or chassis to form an integrated element, executing discrete software components on a common processor core, etc. Conversely, skilled persons will recognize the possibility to separate a single element into two or more discrete elements, such as splitting a single circuit into two or more separate circuits, separating a chip or chassis into discrete elements originally provided thereon, separating a software component into two or more sections and executing each on a separate processor core, etc. Also, it is appreciated that particular implementations of hardware and/or software components are merely illustrative, and other combinations of hardware and/or software that perform the methods described herein are within the scope of the disclosure.

It is appreciated that implementations of methods detailed herein are exemplary in nature and are thus understood as capable of being implemented in a corresponding device. Likewise, it is appreciated that implementations of devices detailed herein are understood as capable of being implemented as a corresponding method. It is thus understood that a device corresponding to a method detailed herein may include one or more components configured to perform each aspect of the related method.

All acronyms defined in the above description additionally hold in all claims included herein.

While the disclosure has been particularly shown and described with reference to specific aspects, it should be understood by those skilled in the art that various changes in form and detail may be made therein without departing from the spirit and scope of the disclosure as defined by the appended claims. The scope of the disclosure is thus indicated by the appended claims and all changes which come within the meaning and range of equivalency of the claims are therefore intended to be embraced.

What is claimed is:

1. A device comprising a processor configured to:
apply a power back-off (PBO) to limit a radio frequency (RF) transmitter power up to a first limit, wherein the first limit is below a pre-defined RF power limit;
accumulate a difference between RF transmission power spent in transmitting data and the pre-defined RF power limit over a duration to produce an accumulated energy budget; and
in response to the accumulated energy budget reaching a pre-defined energy credit value, remove the PBO and allow RF transmitter power exceeding the pre-defined RF power limit to consume the accumulated energy budget until the accumulated energy budget meets a threshold.

2. The device of claim 1, wherein after the accumulated energy budget meets the threshold, the processor is configured to perform subsequent iterations, each respective iteration of the subsequent iterations comprising:
applying the PBO to limit RF transmitter power up to the first limit;
accumulating a difference between RF transmission power spent transmitting data and the pre-defined RF power limit over a duration of the respective iteration to produce an accumulated energy budget for the respective iteration; and
in response to the accumulated energy budget for the respective iteration reaching the pre-defined energy credit value, removing the PBO and allowing RF transmitter power exceeding the pre-defined RF power limit to consume the accumulated energy budget for the respective iteration until the accumulated energy budget for the respective iteration meets the threshold.

3. The device of claim 1, wherein the threshold indicates that the accumulated energy budget has been consumed.

4. The device of claim 3, wherein the threshold is zero.

5. The device of claim 1, wherein the pre-defined energy credit value is a maximum energy credit value providing an upper limit for the accumulated energy budget.

6. The device of claim 5, wherein the pre-defined RF power limit is based on a specific absorption rate (SAR) regulatory transmission power limit.

7. The device of claim 6, wherein the first limit is based on the SAR regulatory transmission power limit and a deficit rate.

8. The device of claim 7, wherein the maximum energy credit value is determined based on the SAR regulatory transmission power limit, a SAR regulatory time period, and/or the deficit rate.

9. The device of claim 7, wherein the deficit rate is based on a percentage of a SAR regulatory transmission energy budget, wherein the SAR regulatory transmission energy budget is based on the SAR regulatory transmission power limit and a SAR regulatory time period.

10. The device of claim 9, wherein the SAR regulatory time period is based on a geographic area and/or an RF band.

11. A method comprising:
applying a power back-off (PBO) to limit a radio frequency (RF) transmitter power up to a first limit, wherein the first limit is below a pre-defined RF power limit;
accumulating a difference between RF transmission power spent transmitting data and the pre-defined RF power limit over a duration to produce an accumulated energy budget; and
in response to the accumulated energy budget reaching a pre-defined energy credit value, removing the PBO and allowing RF transmitter power exceeding the pre-defined RF power limit to consume the accumulated energy budget until the accumulated energy budget meets a threshold.

12. The method of claim 11, wherein after the accumulated energy budget meets the threshold, the method further comprises performing subsequent iterations, each respective iteration of the subsequent iterations comprising:
applying the PBO to limit RF transmitter power up to the first limit;
accumulating a difference between RF transmission power spent transmitting data and the pre-defined RF power limit over a duration of the respective iteration to produce an accumulated energy budget for the respective iteration; and
in response to the accumulated energy budget for the respective iteration reaching the pre-defined energy credit value, removing the PBO and allowing RF transmitter power exceeding the pre-defined RF power limit to consume the accumulated energy budget for the respective iteration until the accumulated energy budget for the respective iteration meets the threshold.

13. The method of claim 11, wherein the pre-defined RF power limit is based on a specific absorption rate (SAR) regulatory transmission power limit.

14. The method of claim 11, wherein the threshold is zero, indicating that the accumulated energy budget has been consumed, and wherein the pre-defined energy credit value is a maximum energy credit value providing an upper limit for the accumulated energy budget.

15. The method of claim 14, wherein the first limit is based on the SAR regulatory transmission power limit and a deficit rate, wherein the maximum energy credit value is determined based on the SAR regulatory transmission power limit and the deficit rate, wherein the deficit rate is based on a percentage of a SAR regulatory transmission energy budget, and wherein the SAR regulatory transmission energy budget is based on a SAR regulatory time period.

16. The method of claim 11, wherein the SAR regulatory time period is based on a geographic area and/or an RF band.

17. One or more non-transitory computer readable media with instructions stored thereon that, when executed by a processor of a device, cause the device to:
apply a power back-off (PBO) to limit a radio frequency (RF) transmitter power up to a first limit, wherein the first limit is below a pre-defined RF power limit;
accumulate a difference between RF transmission power spent in transmitting data and the pre-defined RF power limit over a duration to produce an accumulated energy budget; and
in response to the accumulated energy budget reaching a pre-defined energy credit value, remove the PBO and allow RF transmitter power exceeding the pre-defined RF power limit to consume the accumulated energy budget until the accumulated energy budget meets a threshold.

18. The one or more non-transitory computer readable media of claim 17, further comprising instructions to cause the device to, after the accumulated energy budget meets the threshold, perform subsequent iterations, each respective iteration of the subsequent iterations comprising:
- applying the PBO to limit RF transmitter power up to the first limit;
- accumulating a difference between RF transmission power spent transmitting data and the pre-defined RF power limit over a duration of the respective iteration to produce an accumulated energy budget for the respective iteration; and
- in response to the accumulated energy budget for the respective iteration reaching the pre-defined energy credit value, removing the PBO and allowing RF transmitter power exceeding the pre-defined RF power limit to consume the accumulated energy budget for the respective iteration until the accumulated energy budget for the respective iteration meets the threshold.

19. The one or more non-transitory computer readable media of claim 17, wherein the threshold indicates that the accumulated energy budget has been consumed.

20. The one or more non-transitory computer readable media of claim 17, wherein the pre-defined energy credit value is a maximum energy credit value providing an upper limit for the accumulated energy budget.

\* \* \* \* \*